United States Patent

Ehle et al.

[11] Patent Number: 5,153,894
[45] Date of Patent: Oct. 6, 1992

[54] SMELTING PLANT WITH REMOVABLE SHAFT-LIKE CHARGING MATERIAL PREHEATER

[75] Inventors: Joachim Ehle, Lautenbach; Gerhard Fuchs, Kehl-Bodersweier, both of Fed. Rep. of Germany

[73] Assignee: Fuchs Technology AG, Zug, Switzerland

[21] Appl. No.: 613,479

[22] PCT Filed: Feb. 28, 1990

[86] PCT No.: PCT/EP90/00335

§ 371 Date: Oct. 25, 1990

§ 102(e) Date: Oct. 25, 1990

[87] PCT Pub. No.: WO90/10086

PCT Pub. Date: Sep. 7, 1990

[30] Foreign Application Priority Data

Mar. 2, 1989 [DE] Fed. Rep. of Germany ....... 3906653
Dec. 7, 1989 [DE] Fed. Rep. of Germany ....... 3940558

[51] Int. Cl.$^5$ ............................................. F27D 13/00
[52] U.S. Cl. ............................... 373/80; 373/78; 373/79; 373/81; 373/83; 373/84; 373/86; 373/76; 373/94; 373/100; 373/106
[58] Field of Search ................... 373/85, 86, 79, 80, 373/81, 87, 60, 73, 94, 98, 99, 105, 73, 84, 60, 33, 78, 76, 2, 106, 86; 263/27

[56] References Cited

U.S. PATENT DOCUMENTS

| 2,944,100 | 7/1960 | Sorg et al. ............. | 373/84 |
| 3,441,651 | 4/1969 | Viens et al. ............ | 373/80 |
| 3,565,407 | 2/1971 | Schermer ............... | 263/27 |
| 3,835,231 | 9/1974 | Marchner .............. | 373/84 |
| 3,898,365 | 8/1975 | Antoine et al. ........ | 373/80 |
| 3,980,801 | 9/1976 | Milasius ................ | 373/84 |
| 4,328,388 | 5/1982 | Longenecker ......... | 373/80 |
| 4,617,673 | 10/1986 | Fuchs et al. ........... | 373/80 |
| 4,653,065 | 3/1987 | Seki et al. .............. | 373/80 |
| 4,740,989 | 4/1988 | Steipe et al. ........... | 373/78 |
| 4,841,542 | 6/1989 | Zajicek et al. ......... | 373/73 |

FOREIGN PATENT DOCUMENTS

| 0170809 | 7/1986 | European Pat. Off. . |
| 0291680 | 11/1988 | European Pat. Off. . |
| 0203339 | 9/1989 | European Pat. Off. . |
| 0910418 | 5/1954 | Fed. Rep. of Germany . |
| 1937839 | 2/1970 | Fed. Rep. of Germany . |
| 2309343 | 2/1973 | Fed. Rep. of Germany . |
| 8412739 | 3/1986 | Fed. Rep. of Germany . |

Primary Examiner—Bruce A. Reynolds
Assistant Examiner—Tu Hoang

[57] ABSTRACT

This invention is directed to a smelting plant with shaft-like charging material preheater. In a smelting plant with an electric arc furnace (1) and a charging material preheater (2) of shaft configuration arranged laterally on the furnace, the outer walls of the charging material preheater in the lower region thereof are formed by the vessel wall (5) of the furnace while in the region thereabove they are formed by the walls of a shaft which is fixed in a holding structure (27). By a horizontal relative movement between the furnace vessel (3) and the holding structure (27) together with the vessel cover (6), without being impeded by the shaft (10) charging material can be charged from a scrap basket directly into the furnace vessel or through the displaced shaft into different regions of the furnace vessel (3). Charging material can be retained in the shaft by means of a blocking member (51) therein, and heated up during the refining phase.

36 Claims, 11 Drawing Sheets

SMELTING PLANT WITH REMOVABLE SHAFT-LIKE CHARGING MATERIAL PREHEATER

The invention relates to a smelting plant.

A smelting plant of that kind is disclosed in German utility model No 84 12 739.

In the known smelting plant the charging material is charged through a shaft-like charging material preheater into a metal sump present in the furnace vessel. In that situation the problem arises that, after the tapping operation and re-igniting the electric arc, the electrical energy input is restricted by the bath temperature which is high at that time. The residual sump which remains in the furnace vessel after the tapping operation cools down so little in that brief period of time that only a low level of electrical energy can be input in order to prevent the bath from overheating. Therefore the power available for the smelting operation cannot be utilized in the initial phase so that the smelting time is correspondingly increased.

For the purpose of reducing the period of time involved in the smelting procedure and for the purposes of protecting the furnace walls, it is desirable after each tapping operation to introduce the charging material not just at the side of the furnace vessel at which the charging material preheater is disposed, but in such a way as to be distributed over the entire cross-section of the furnace, or specifically and deliberately on the side of the furnace vessel which is in opposite relationship to the charging material preheater.

Problems of space arise when the content of a scrap metal basket is charged directly into the furnace vessel, due to the shaft of the charging material preheater which is disposed on one side of the furnace vessel, and the electrode lifting and pivoting apparatus which is disposed on the other side of the furnace vessel. Furthermore such a charging operation involves environmental pollution.

The object of the present invention is to provide a smelting plant wherein, without being impeded by the shaft, the charging material can be introduced by means of a scrap metal basket into the entire cross-section of the furnace, or specifically on the side of the furnace vessel which is in opposite relationship to the charging material preheater. The invention further seeks to provide that the charging operation involves the minimum level of environmental pollution.

That object is attained by the features of this invention and by other advantageous configurations in accordance with the invention.

Accordingly the walls of the charging preheater, in the lower region of the preheater, up to the level of the upper edge of the furnace vessel, are formed by a part of the vessel wall against which the column of charging material can laterally bear, and in the region thereabove, by the walls of a shaft fixed in a holding structure. The holding structure carrying the shaft, and the furnace vessel, are movable relative to each other. The furnace vessel cover is preferably releasably fixed to the holding structure. It then forms a structural unit with the shaft. In that way, the shaft of the charging material preheater can be removed simultaneously with the furnace cover when it is removed, and sufficient space is provided for charging material directly into the furnace vessel.

Subdividing the preheater into an upper shaft fixed in a holding structure and lower portion formed by a part of the vessel wall affords further options which are advantageous in regard to the charging and smelting procedure, particularly when the shaft is structurally combined with the cover. The shaft itself can be utilized for specifically charging material into the furnace vessel, by virtue of a horizontal relative movement as between the furnace cover and the furnace vessel, while environmental pollution can be minimized in the charging operation, by virtue of the furnace vessel being substantially covered over by the cover. The horizontal relative movement can be a pivotal or a linear movement of the furnace vessel cover and/or a linear movement of the furnace vessel. The spacing between the upper edge of the vessel and the lower edge of the vessel cover, which is required for the horizontal relative movement to take place, can be provided either by raising the cover or by lowering the vessel.

In a particularly advantageous configuration of the invention, the furnace vessel is fixed in an upper frame which is supported by way of a frame lifting means on a lower support structure which is adapted to be mobile. In that way the furnace vessel cover and the shaft can be stationary. The frame lifting means may be formed for example by hydraulic lifting cylinders which are arranged at the four corners of a rectangular frame and which are controlled in pairs and which, besides a slight lifting and lowering movement of the furnace vessel, permit tilting thereof in one direction for carrying out the tapping operation and tilting thereof in the other direction for the removal of slag from the furnace vessel. The mobile design configuration of the support structure permits the desired horizontal displacement as between the furnace vessel cover and the shaft, either for charging of the furnace vessel with a scrap metal basket outside the region of the cover, or for specifically charging material into the furnace vessel through the shaft of the furnace vessel cover. In that connection the relative horizontal displacement takes place parallel to the connecting line between the middle of the furnace vessel cover and the center line of the shaft, and the tilting movement for tapping and for slag removal purposes takes place perpendicularly thereto.

Preferably in plan view the furnace vessel is in the form of an oval which is delimited on one side by a straight line, wherein the straight wall portion together with adjoining portions of the oval forms the walls of the charging material preheater in the lower region thereof.

The wall, which is adjacent to the electrodes, of the shaft may be extended a distance under the underside of the cover in order to define the connecting zone between the interior of the charging material preheater and the interior of the furnace vessel. With an enlarged connecting zone however retention of the material which is charged into the shaft of the charging material preheater may also be promoted by virtue of the fact that the floor of the charging material preheater is designed to drop away towards the furnace hearth at an angle of inclination of more than 30° and less than 60°.

In order to keep down the weight of the shaft the shaft walls are preferably formed by water-cooled wall elements.

Usually the electrode lifting apparatus is arranged beside the furnace vessel on the side thereof which is opposite to the charging material preheater so that the shaft does not impede the pivotal movement of the electrodes. Normally the cover lifting and pivoting apparatus is also disposed on the same side as the electrode lifting apparatus. As in the smelting plant according to the invention however the center of gravity is close to the shaft, the lifting and pivoting apparatus for the holding structure of the shaft, which preferably also carries the vessel cover, is preferably arranged in the vicinity of the charging material preheater, on the side of the furnace vessel which is opposite to the electrode lifting apparatus. The arrangement may also include a movable portal assembly which is supported on rails on both sides of the smelting plant and the support beams of which carry the holding structure of the shaft and possibly the vessel cover.

The lifting and pivoting apparatus for the furnace vessel cover can in principle be of the design configuration described in EP-A-203 339. In accordance therewith, fixed on a laterally pivotable rotary portal assembly which is arranged beside the charging material preheater is a lifting apparatus which includes at least one support member which can be raised and lowered and which engages the cover. If that arrangement is so designed that the support member is released from the cover in the lowered position, then, in the case of a tiltable furnace vessel, the lifting and pivoting apparatus does not need also to be tilted, but can be in the form of a unit which is disposed on stationary foundations. It will be appreciated however that, with suitable dimensioning of the furnace rocking cradle, the lifting and pivoting apparatus can be fitted onto a furnace platform which also performs a tilting movement.

When using a tiltable construction, the furnace vessel is to be tiltable perpendicularly to a line connecting the middle of the charging material preheater to the middle of the furnace hearth.

When the apparatus for removing the holding structure of the shaft is in the form of a lifting and pivoting apparatus, it is to be adapted to be pivoted away to the same side with respect to the furnace vessel as the electrode lifting and pivoting apparatus, that is to say one apparatus is to be adapted to pivot out of the operative position in a mathematically positive sense and the other apparatus is adapted to be pivoted out of the operative position in the mathematically negative direction. That provides space for the charging operation on the other side.

In regard to a reduction in the length of time involved in the smelting procedure, and savings of energy, it is desirable for the charging material which is introduced after the tapping operation either by means of a scrap basket or specifically by way of the shaft of the cover, to be preheated with waste gases from the smelting vessel. For that purpose, beside the charging material preheater, there may be provided an additional preheating chamber for receiving a container which is filled with charging material, the preheating chamber being connected to the gas outlet of the shaft-like charging material preheater and making it possible for the hot waste gases also to be utilized during the refining phase when the shaft-like charging material preheater is empty. An additional preheating chamber is unnecessary if, in accordance with a further development of this invention, disposed in the shaft is at least one movable blocking or barrier member which in a closed position retains charging material in the shaft, while gas is permitted to pass through, and which in an open or release position releases the preheated charging material and permits the material to be unimpededly charged into the furnace through the shaft. That construction is particularly environment-friendly in that respect because the charging material which is preheated during the refining phase can be charged into the furnace vessel without removal of the entire furnace vessel cover.

The invention will be described in greater detail by means of embodiments with reference to the drawings set forth in FIGS. 1-12. In the diagrammatic drawings.

Figure 6:
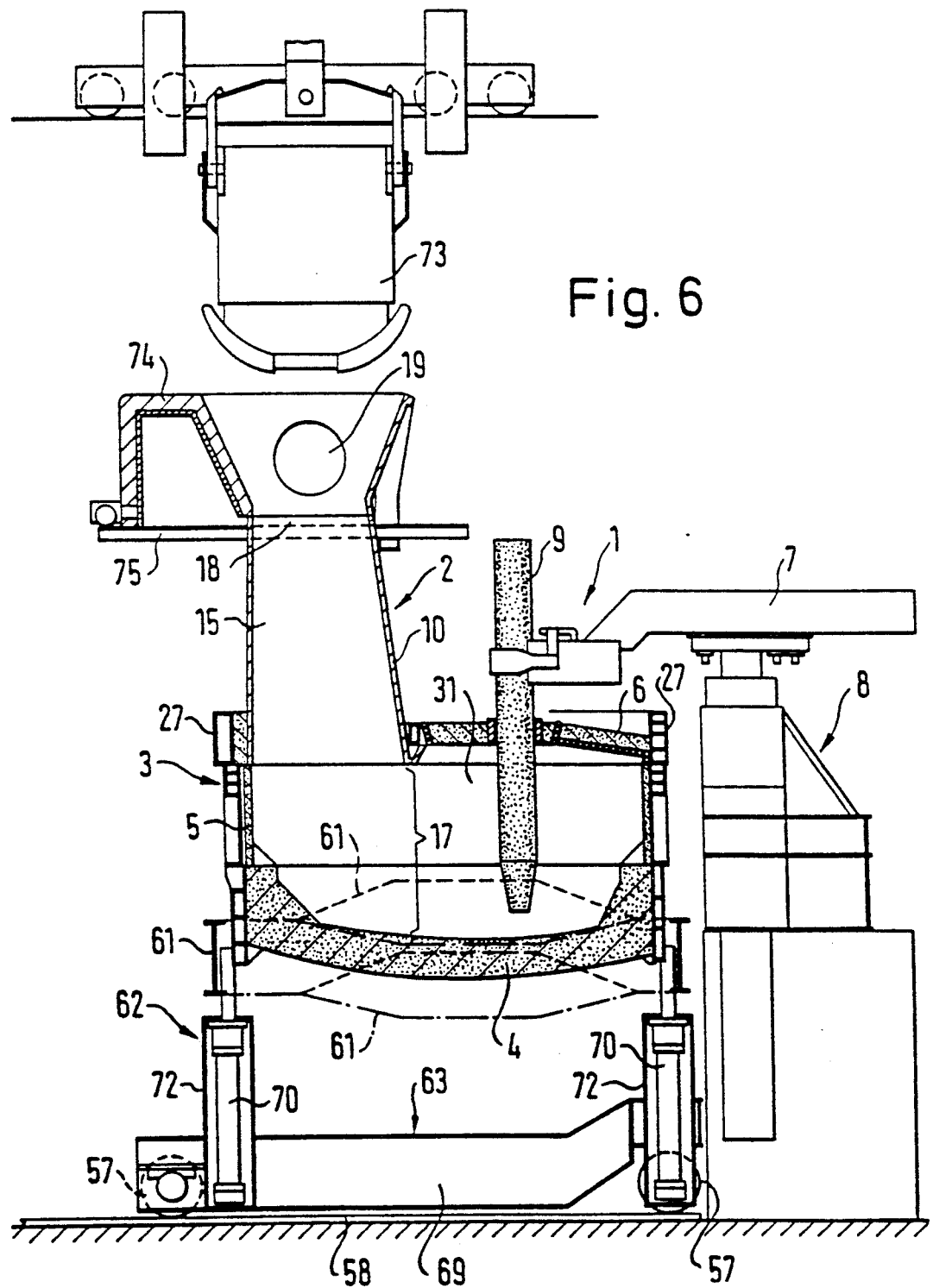
FIG. 6 through 12 are different views of a third embodiment.
Figure 7:
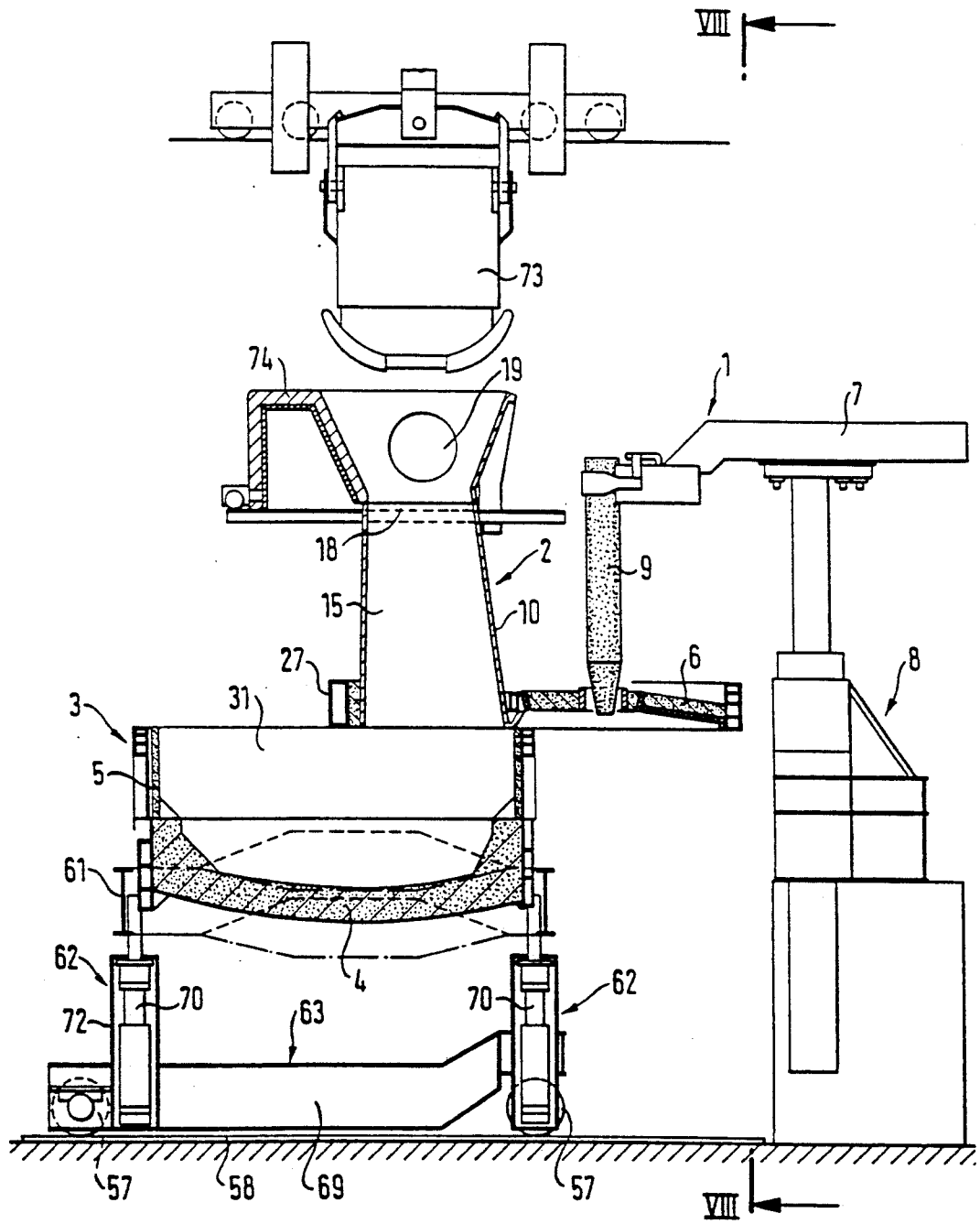
Figure 8:
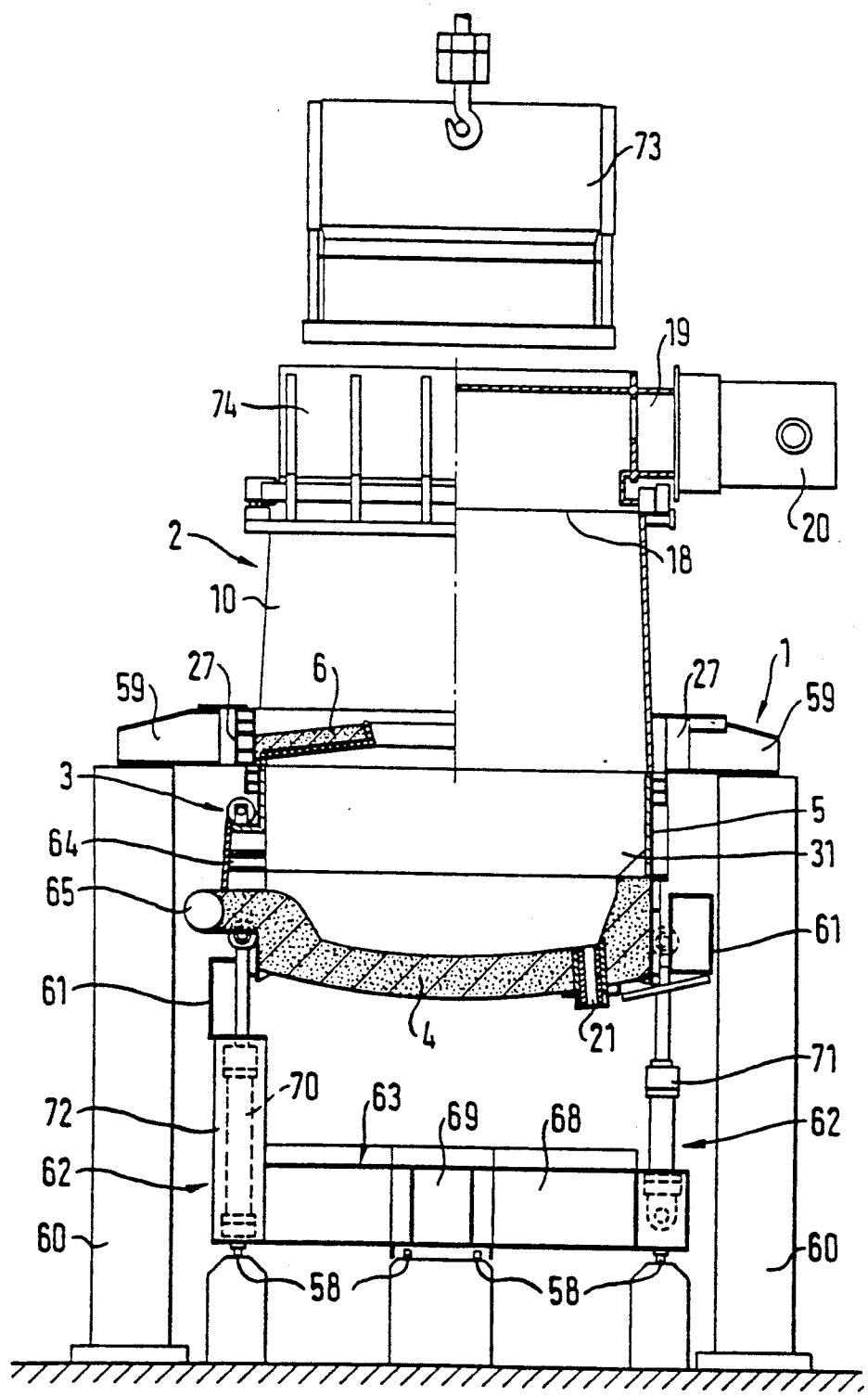
Figure 9:
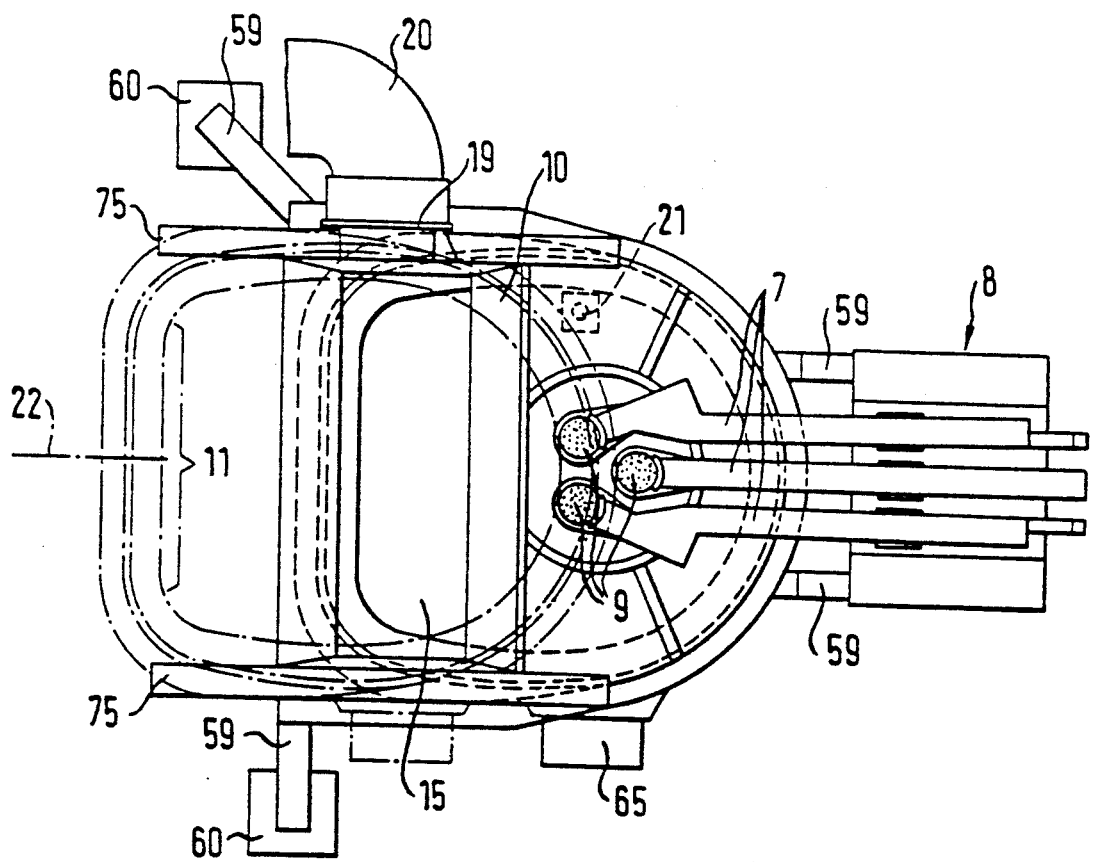
Figure 10:
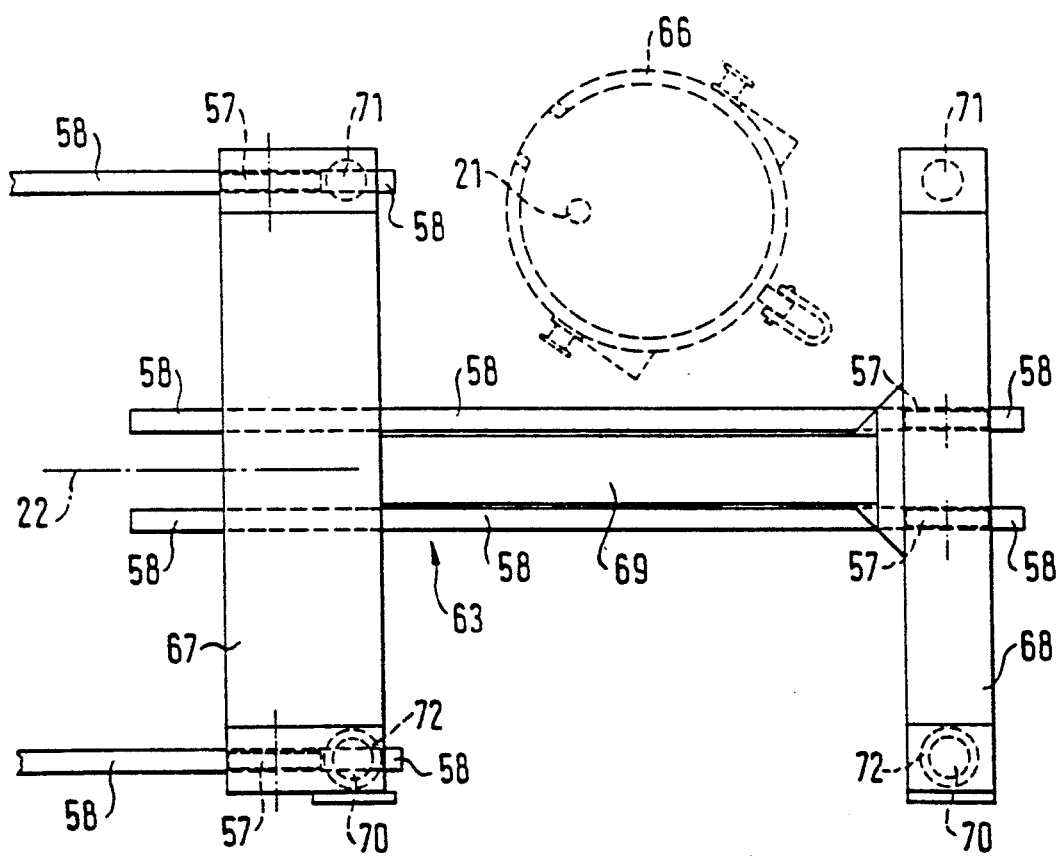
Figure 11:
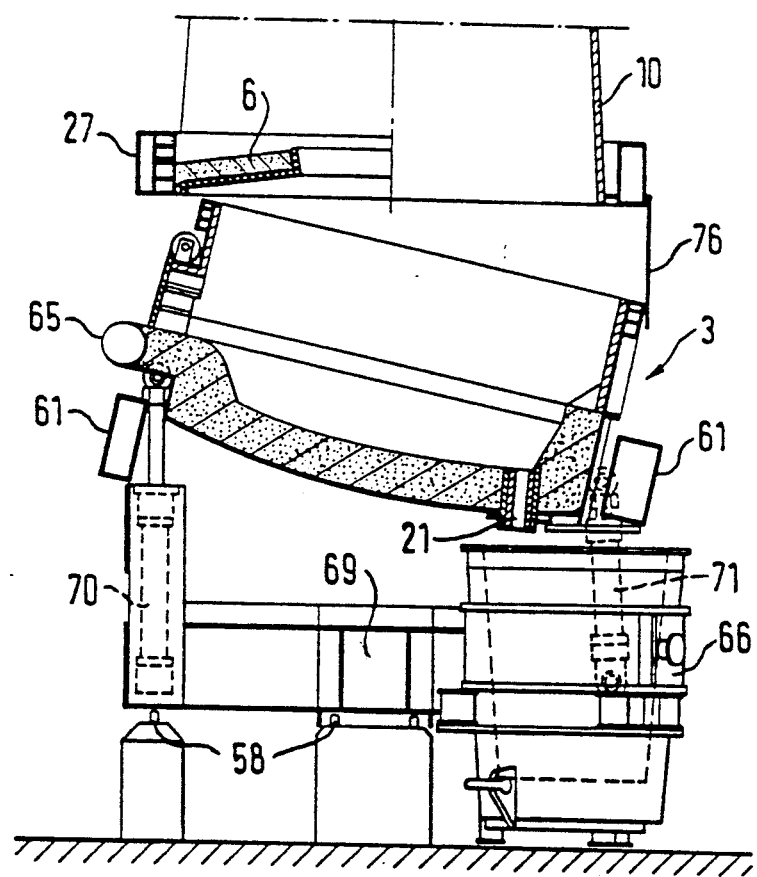

Accordingly, FIG. 6 is a side view in the basic position; FIG. 7 is a side view with the vessel in a displaced position;

FIG. 8 is a view partly in section taken along line VIII—VIII in FIG. 7;

FIG. 9 is a plan view of the smelting plant;

FIG. 10 is a plan view of the support structure of the furnace vessel;

FIG. 11 shows the furnace vessel in the tapping position; and

Figure 12:
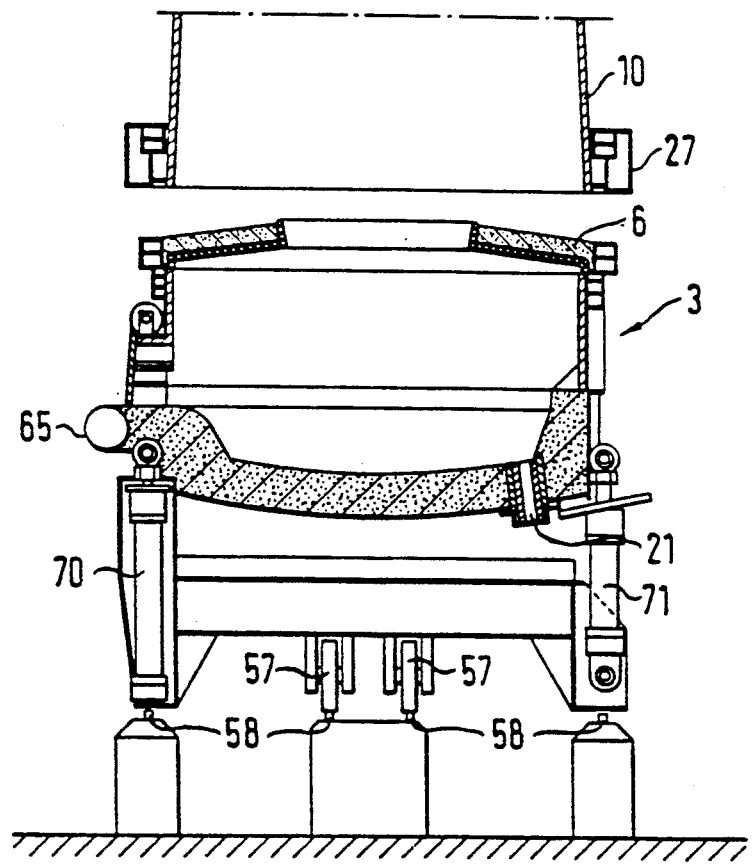

FIG. 12 shows the smelting plant with the furnace vessel cover removed from the shaft.

Figure 1:
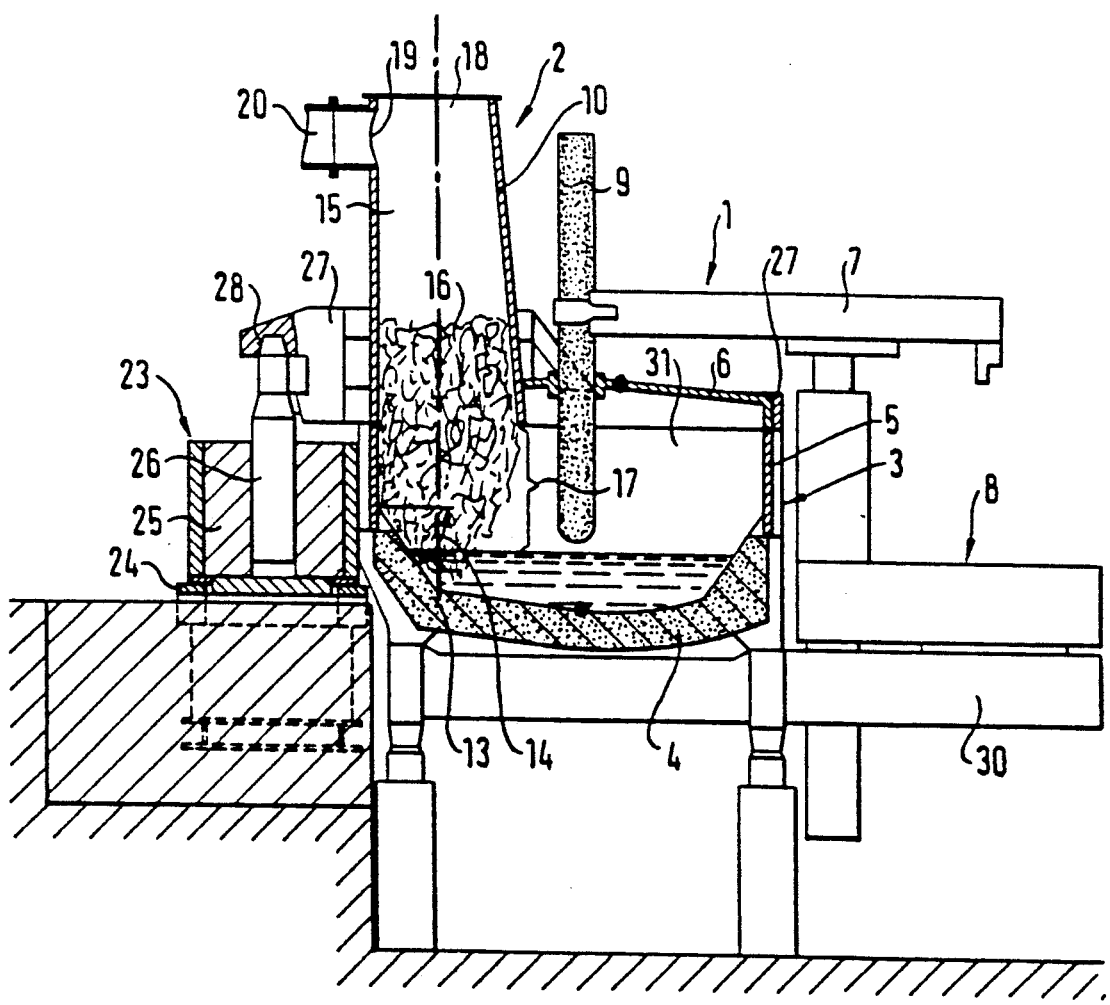
FIG. 1 is a partly sectional side view of a smelting plant.
Figure 2:
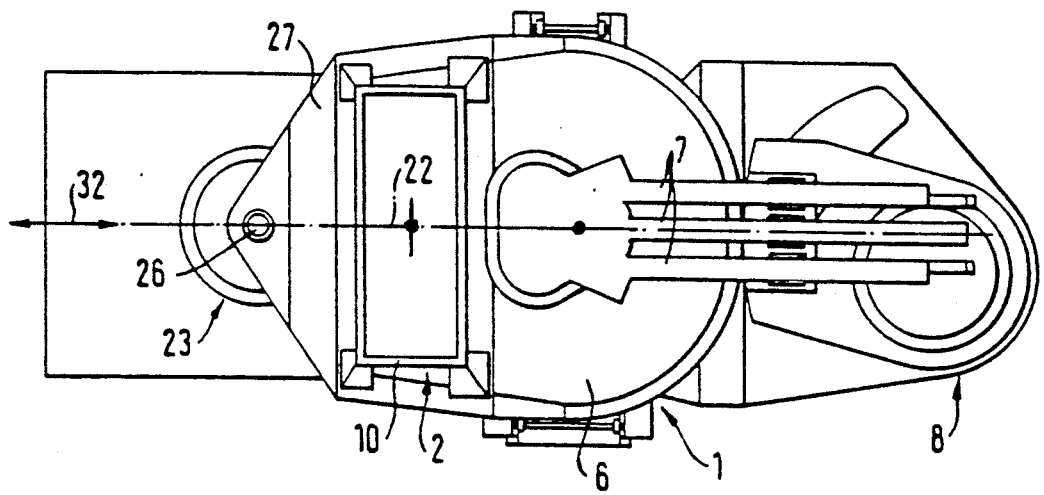
FIG. 2 is a plan view of the smelting plant with the cover disposed on the furnace vessel and the electrodes in the inserted position.
Figure 3:
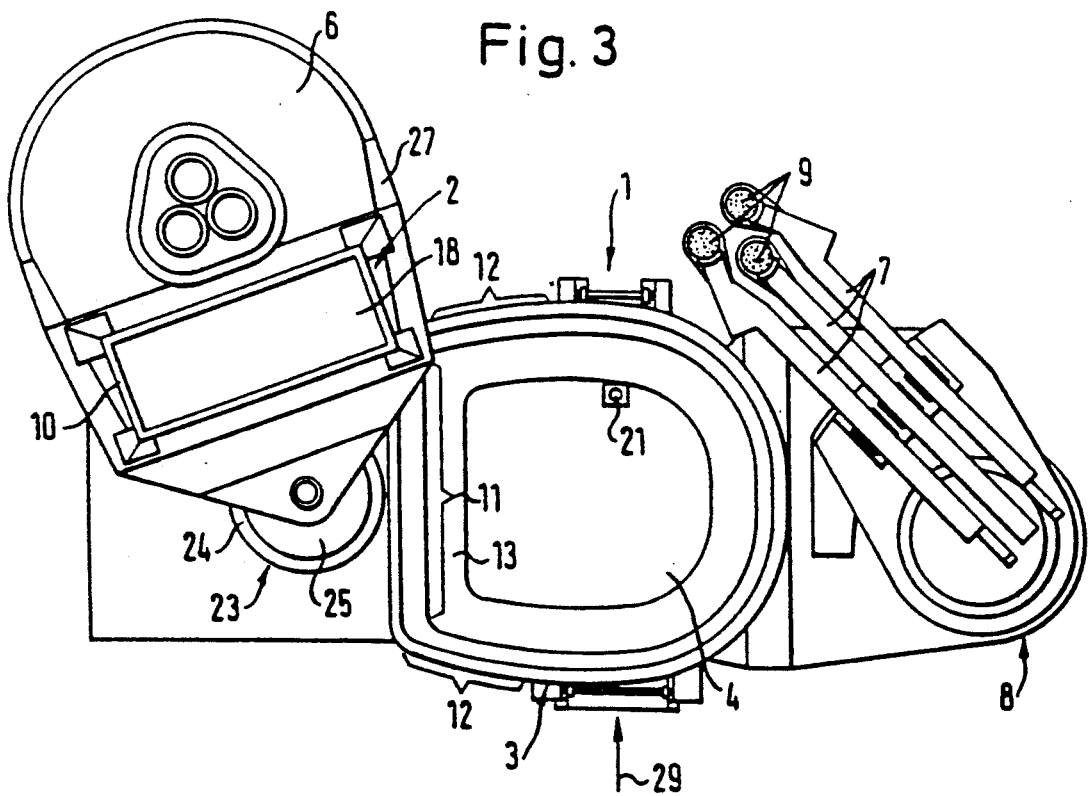
FIG. 3 is a view corresponding to that shown in FIG. 2 with the electrodes and the cover in the positions of being pivoted away.

The smelting plant shown in FIGS. 1 through 3 includes an electric arc furnace 1 and a shaft-like charging material preheater 2. The arc furnace includes a furnace vessel 3 comprising a furnace hearth 4 and a vessel wall 5. The furnace vessel 3 is closed with a cover 6 which can be pivoted away and through which three electrodes 9 can be introduced into the furnace vessel. The electrodes 9 are carried by support arms 7 and can be raised and pivoted laterally by means of a lifting and pivoting apparatus 8. Only one electrode is shown in FIG. 1, for the sake of clarity of the drawing.

The charging material preheater 2 is arranged laterally on the furnace vessel 3. In the lower region of the charging material preheater, which extends as far as the upper edge of the furnace wall 5, the outside walls of the charging material preheater are formed by the vessel wall 5. In the region thereabove the walls of the charging material preheater are formed by a shaft 10 which like the cover 6 is fixed in a holding structure 27 and by way of the latter forms a structural unit with the vessel cover 6. As FIG. 3 in particular shows, in plan view the furnace vessel 3 is in the form of an oval which is delimited on one side by a straight line. The straight wall portion 11, together with adjoining portions 12 of the oval, forms the outer shaft walls in the lower region of the charging material preheater. The brick-lined floor 13 of the charging material preheater falls away towards the floor of the brick-lined furnace hearth 4, at an angle of inclination as indicated at 14 of about 45°.

The walls of the shaft 10 are formed by water-cooled wall elements for reasons of weight.

The cross-section of the interior 15 of the shaft 10 increases in a downward direction in order to ensure a trouble-free flow of the charging material 16 in the shaft 10.

In the present case the shaft 10 is of approximately rectangular shape in plan and extends upwardly the cross-section of the charging material preheater 2, which is defined by the wall portions 11 and 12 of the furnace vessel 3. In this case formed between the charging material preheater 2 and the arc furnace 1 is a connecting zone 17 which extends over the internal height and the internal width of the furnace vessel in the notional common plane between the charging material preheater and the arc furnace. It will be appreciated that the cross-sectional shape selected for the shaft may differ from a rectangular shape, and it also does not need to extend over the entire width of the furnace vessel or cover. In addition the wall of the shaft 10 which faces towards the arc furnace 1 may be extended downwardly from the edge of the cover within the furnace vessel in order to reduce the internal height of the connecting zone 17. When the cover is removed, it must then be lifted higher by the appropriate distance before it can be displaced laterally.

In the upper region the charging material preheater 2 has a closable loading opening 18 and a gas outlet 19. The gas outlet 19 is communicated by way of a gas pipe 20 with the chimney or a preheating chamber which is suitable for accommodating a scrap basket or container which is filled with charging material.

As can be seen from FIG. 2, in the first embodiment the electrodes 9 are displaced in the direction of the charging material preheater 2. In that way the radiant heat produced by the arcs can act to an enhanced degree on the charging material which is supplied by way of the charging material preheater 2 and at the same time the radiant heat loading on the free wall regions of the arc furnace can be reduced.

As FIG. 3 shows, the furnace hearth 4 has an eccentrically arranged tap hole 21. The furnace vessel 3 is designed to be tiltable for the tapping operation in known manner, with the tilting movement taking place perpendicularly to a line 22 as shown in FIG. 2 which connects the middle of the charging material preheater with the middle of the furnace hearth.

In the illustrated smelting plant, the electrode lifting and pivoting apparatus 8 is arranged beside the furnace vessel 3 on the side of the cover 6 which is in opposite relationship to the shaft 10, and a lifting and pivoting apparatus 23 for the holding structure 27 and therewith also for the vessel cover 6 is arranged beside the charging material preheater 2. The lifting and pivoting apparatus 23 can be designed in accordance with the principle described in EP-A-203 939. In the illustrated cased fixed on a rotary portal assembly 24 is a lifting cylinder 25 with a support member 26 which can be raised and lowered and which in the lowered position is released from a holding structure 27 fixedly connected to the vessel cover 6, and in the raised position engages into a lifting eye 28 of the holding structure 27, which lifting eye is adapted to the support member. The lifting and pivoting apparatus 23 can lift the shaft 10 together with the cover 6 and pivot same to the side. FIG. 3 shows the cover and also the electrodes in the position of being pivoted to the side. It will be seen that the vessel cover and the electrodes can be pivoted away to the same side in relation to the furnace vessel 3, that is to say in the illustrated case towards the tap hole side, so that a scrap basket can be unimpededly moved into position over the open furnace vessel 3 from the other side in the direction indicated by an arrow 29, and emptied into the furnace vessel.

Instead of a rotary portal assembly 24, the mobile portal assembly may also be a linearly movable portal assembly with a lifting apparatus. In that case it is advantageous for the portal assembly carrying the lifting apparatus to be movable in the direction indicated by a double-headed arrow 32 in FIG. 2.

In the illustrated construction the electrode lifting and pivoting apparatus 8 is fixed on a furnace platform 30 which also performs a tilting movement and which for that purpose must be of suitably stable dimensioning while the lifting and pivoting apparatus 23 for the holding structure 27 is in the form of a unit which is supported directly on the foundations. The latter construction is possible for the reason that, in the lowered position of the support member 26, the lifting and pivoting apparatus 23 is uncoupled from the holding structure 27 of the vessel cover 6, so that the furnace vessel together with the vessel cover can be tilted without being impeded by the lifting and pivoting apparatus 23.

Figure 4:
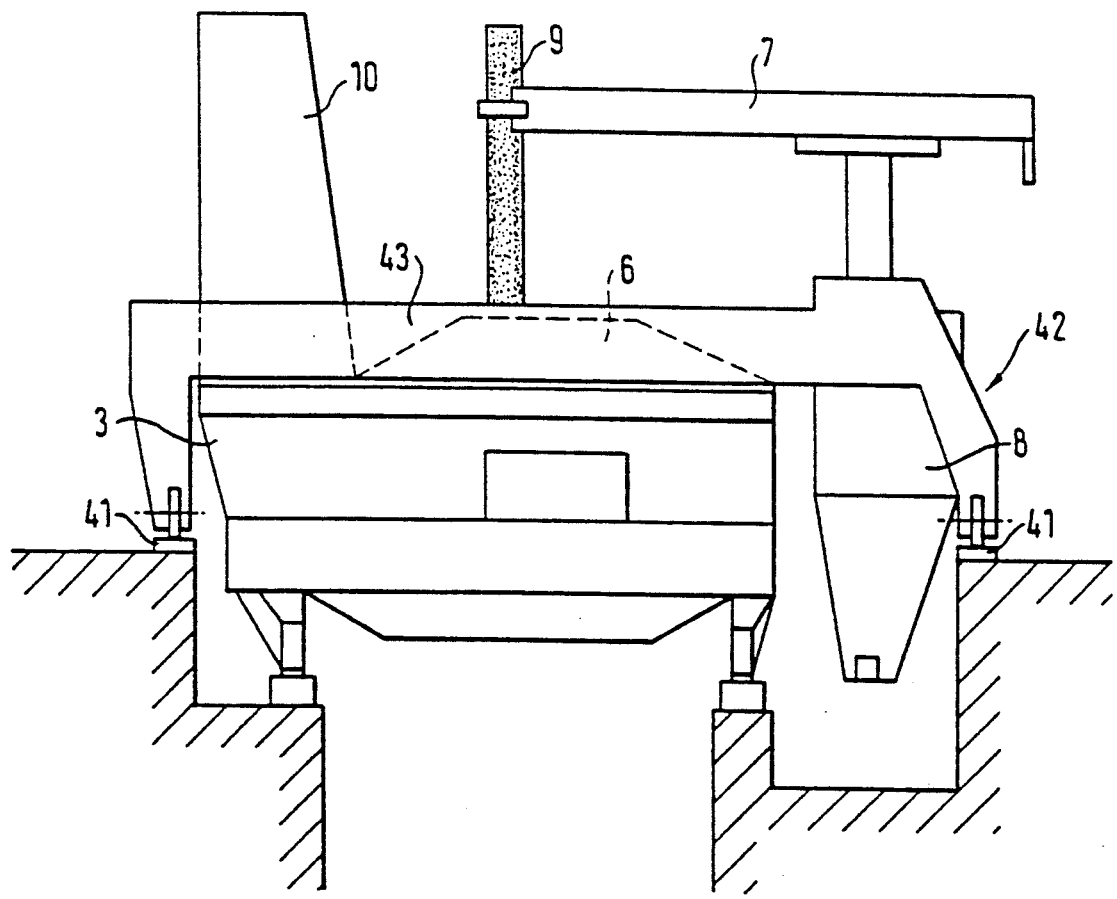
FIG. 4 is a side view of a second embodiment.

In the embodiment illustrated in FIG. 4, upon removal of the vessel cover, it is not pivoted towards the side but is moved towards the side after having being lifted. For that purpose the arrangement has a portal assembly 42 which is movable on two rails 41. The rails 41 are mounted on the foundation structure on both sides of the smelting plant. The movable portal assembly 42 has two support beams 43 which extend over the smelting plant. In the view shown in FIG. 4 one of the support beams 43 is arranged in front of the shaft 10 and one support beam is arranged behind the shaft 10. In the present case the movable portal assembly also carries the electrode lifting and pivoting apparatus 8. The support beams 43 are connected to the vessel cover 6 or a holding structure for the shaft 10 at suitable locations, by way of uncouplable lifting devices which is not shown, so that when required the shaft and the vessel cover can be lifted and moved to one side. On the other hand, the arrangement used is not to impede the tilting movement when removing slag from and tapping the furnace vessel 3.

The arc furnace can be in the form of an alternating current arc furnace or a direct current arc furnace with one or more electrode or electrodes which can be introduced through the vessel cover.

Figure 5:
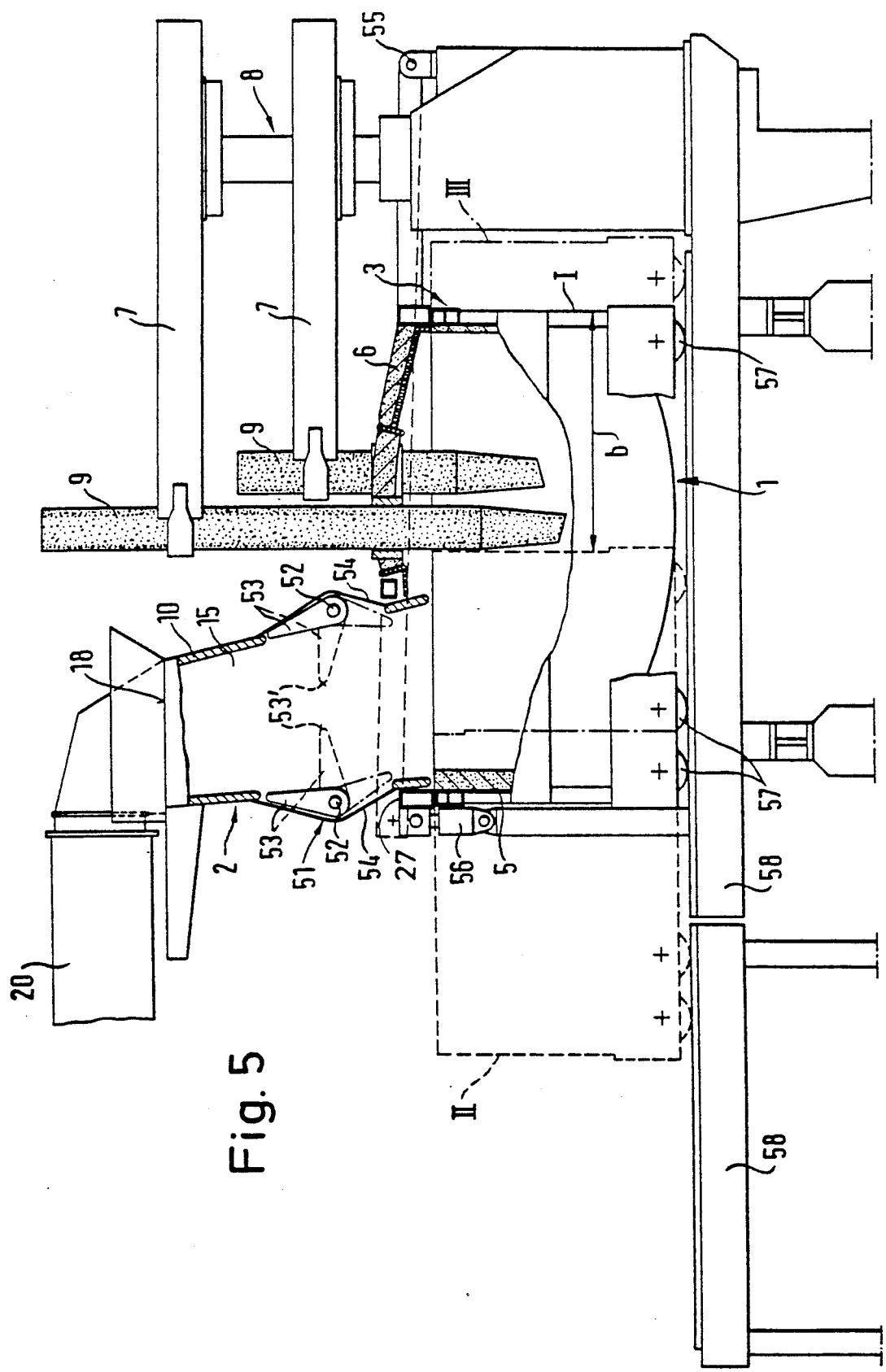
FIG. 5 is a partly sectional side view of a third embodiment with a mobile furnace vessel and blocking members in that shaft.

The arc furnace 1 shown in FIG. 5 has a furnace vessel 3 which is displaceable horizontally by way of wheels 57 on two parallel rails 58 of which only the front rail is visible in the drawing.

Arranged in the shaft 10 of the preheater 2 is a barrier or blocking member which is generally identified by reference numeral 51. The blocking member 51 comprises two for example water-cooled rollers 52 which are arranged in mutually opposite relationship substantially in a common horizontal plane, while cantilever carriers 53 extend from the rollers 52 in respective rows which are disposed in a common plane. The carriers 53 are each of the same configuration and, like the rollers 52, may be water-cooled.

The rollers 52 are each rotatably mounted in respective receiving means 54. The mounting means which are not shown may be of a flexible configuration, for example, using mechanical spring elements or hydraulic damping elements. The rollers can be driven by way of drive means which are not shown and can be stopped in predeterminable angular positions. The receiving means 54 are each formed by an enlarged region of the charging material preheater 2, wherein the respective corresponding wall region of the shaft 10 is displaced outwardly in the direction of a respective receiving means 54 so that the rollers 52 with the associated carriers 53 are arranged gas-tightly within the shaft 10.

The two rollers 52 can be driven substantially simultaneously in such a way that the carriers can occupy the positions shown in solid lines in FIG. 5 as well as the positions shown in dashed and dash-dotted lines. The solid lines show a release or open position in respect of the respective carriers 53, in which the rows of carriers are disposed within the respective receiving means 54. When the blocking member 51 or the carriers 53 is or are in that position, the carriers 53 are entirely withdrawn and a column of charging material can be charged through the shaft. The column of charging material is supported on the floor and wall region of the furnace vessel 3, which is beneath same.

At an end region which is in opposite relationship to the charging material preheater 2, the holding structure for the shaft 10 and cover 6 is pivotably mounted to the electrode lifting and pivoting apparatus 8 by way of a rotary mounting 55. In opposite relationship to the rotary mounting 55, the holding structure is engaged by a lifting apparatus 56 comprising one or more and preferably two piston-cylinder units in order to pivot the cover 6 with the shaft 10 upwardly about the rotary mounting 55 and therewith relative to the furnace vessel 3. By actuation of the lifting apparatus 56, the shaft 10 and cover 6 can thus be pivoted out of a position in which they lie on the upper edge of the furnace vessel 3 and close the vessel. In the lifted position of the holding structure 6 the furnace vessel 3 can be displaced on the rails 58 by way of the wheels 57 in different directions. The furnace vessel 3 can thus be moved from the basic position I shown in solid lines in FIG. 5, for example into the position II which is to the left thereof, as shown in broken lines, or into the position III which is to the right of the basic position and which is shown in dash-dotted lines. The association of the furnace vessel with respect to the shaft 10 alters in accordance with the respective position of the furnace vessel. In that way different regions of the furnace vessel 3 can be specifically and deliberately associated with the shaft 10. With the association therebetween, which occurs when the furnace vessel 3 is in the basic position, the shaft 10 of the charging material preheater 2 is arranged above a first region of the furnace vessel 3, for introducing a column of charging material into same. The furnace vessel 3 can be moved out of that association in such a way that the shaft 10 is associated with a second region of the furnace vessel 3, which is disposed at a spacing as indicated at b; in that position the furnace vessel 3 is disposed in position II. Therefore, the positional association as between the shaft 10 and the furnace vessel 3, which can be predetermined by displacement of the furnace vessel 3, means that it is possible for the batch material to be used in the arc furnace to be specifically introduced into the furnace vessel 3, in dependence on the respective operating condition or the state of the procedure.

Displacement in the opposite direction into position III may be effected in order to move a column of charging material, which is introduced at the left-hand side of the furnace vessel, closer to the electrodes 9, in order to provide a faster melting effect.

A typical operating procedure will now be described. With the carriers 53 in their open position and with the shaft 10 being in a position of being associated with the furnace vessel 3 above the first region thereof, a column of charging material can be charged into the furnace vessel by way of the shaft 10 during a smelting phase. Basic position I of the furnace vessel 3 as illustrated in FIG. 5 corresponds to that association. After the termination of the smelting phase, the column of charging material has been melted and the charging material preheater 2 is substantially empty. Any portions of the column of charging material which are still remaining in the shaft 10, for example due to the material forming bridges therein, can be easily conveyed into the furnace vessel 1 by a rotary movement of the carriers 53, and by virtue of the pressure which is applied to the charging material when than happens. In order to expedite the smelting process, the furnace vessel 3 may be moved during or after the operation of introducing the column of charging material, in such a way that the distance of the column of charging material from the electrodes 9 is reduced. For that purpose for example the furnace vessel 3 can be moved into position III. The energy of the arcs can thus be used specifically to cause smelting of the column of charging material.

In the course of the refining phase which follows the operation of melting the column of charging material, no charging material is added to the molten metal bath, in order to produce a molten metal bath having the required properties. With the smelting plant shown in FIG. 5, it is possible for charging material to be introduced into the shaft 10 when the carriers 53 are in their closed position. That charging material is preheated by hot gas which rises from the furnace vessel 3 and passes into the shaft 10, during the refining phase. The charging material is available for charging the furnace vessel 3 after tapping thereof. So that the wall region of the furnace vessel 3 which is shown at the right in FIG. 5 is protected from the excessive effects of heat from the electrodes 9, the charging material in the shaft 10 is charged into the furnace vessel 3 when, by virtue of displacement of the furnace vessel 3 relative to the substantially stationary shaft 10, the shaft 10 has been associated with the right-hand region of the furnace vessel 3. The position II shown in FIG. 5 corresponds to that condition of association. In that position the heated charging material can be delivered to the right-hand region of the furnace vessel 3.

Then, for charging material into the left-hand region of the furnace vessel 3, the furnace vessel 3 is moved back into basic position I as shown in solid lines in FIG. 5. In that condition the carriers 53 can be moved into their release or open position in which they do not impede the continuous charging of charging material through the shaft 10.

Thus, preheating of the charging material within the shaft 10 can also be effected during the refining phase. As the cover 6 only has to be lifted to a slight extent for movement of the furnace vessel 3, that arrangement ensures that no environmental pollution occurs during the preheating phase and also during the charging phase.

In the embodiment of the invention which is shown in various views and operating conditions in FIGS. 6 through 12, the holding structure 27 for the shaft 10 in which the cover is releasably fixed is mounted in a stationary position by means of cantilever arms 59 on foundation columns or pillars 60 and the electrode lifting and pivoting apparatus 8 as shown in FIGS. 8 and 9. The furnace vessel 3 is fixed in an upper frame 61 which is supported on a support structure 63 by way of a frame lifting apparatus 62. The support structure 63 is movable parallel to the connecting line between the center line of the shaft and the center of the furnace hearth, that is to say parallel to the line 22 as shown in FIG. 9. For that purpose, in the view shown in FIG. 6, the support structure is provided with wheels 57 running on rails 58, on the left-hand and on the right-hand sides.

As in the above-described embodiments, the furnace vessel can be tilted in a direction transverse with respect to the line 22 connecting the center line of the charging material preheater 2 to the center of the furnace hearth 4, more specifically it can be tilted towards one side in which a tap hole 21 is disposed adjacent the edge of the furnace hearth 4, for the tapping operation, and it can be tilted for the slag removal operation towards the other side at which there is provided a working opening 64, which can be closed by a liftable door, with an operating plate 65. In order to provide space for a laddle 66 as shown in FIG. 11 when tapping the furnace vessel, the upper frame 61 is offset upwardly on that side as shown by the broken line in FIG. 6. On the opposite side, because of the space required for the opening 64, the upper frame 61 is displaced or offset downwardly as shown by the dash-dotted line in FIG. 6.

For reasons of space for the laddle 66 and a slag truck which is not shown and which is to be disposed beneath the plate 65, the support structure 63 is also of a particular configuration. As FIG. 10 shows in plan view, the support structure 63 comprises two parallel transverse bearers 67 and 68 and a longitudinal bearer 69 which connects the transverse bearers 67 and 68 approximately at the middle. The runner wheels 57 are respectively mounted in the end regions of the transverse bearer 67 and in the middle region of the transverse bearer 68, while two spaced-apart wheels 57 are also provided in the middle region of the transverse bearer 68. In that way the rails for the wheels of the transverse bearer 68 can also be moved into the middle so that they do not impede either the laddle on one side or the slag truck on the other side. In the illustrated construction the frame lifting apparatus 62 is formed by four lifting elements 70 and 71 which are arranged at the periphery of the frame 61, more specifically in the region of the corners of the frame which is approximately rectangular in plan view. The lifting elements 70 and 71 comprise hydraulically actuable piston-cylinder units, but they could also comprise other components such as a toothed pinion and a rack co-operating therewith, or a screw spindle drive. Lifting elements are provided on both sides of the line 22 which connects the center line of the charging material preheater to the middle of the furnace hearth, while in the illustrated embodiment the lifting elements 71 are pivotable about axes of rotation which are parallel to the line 22, on the tapping side, both in the frame 61 and also in the support structure 63, while on the slag side shown on the left-hand side in FIG. 8, the lifting elements have a vertical guide action and are mounted pivotably about an axis of rotation which is parallel to the line 22, only in the upper frame 61. The lifting elements 71 and the lifting elements 70 are respectively controllable synchronously. By synchronous downward movement of the lifting elements 71, the furnace vessel can be tilted towards one side for the tapping operation while by synchronous downward movement of the lifting elements 70 the furnace vessel can be tilted towards the other side for the slag-removal operation. If all the lifting elements are lowered synchronously, the furnace vessel 3 can be lowered without tilting.

In the illustrated construction the vertical guide action in respect of the lift elements 70 is provided by the hydraulic cylinders being held in tubes 72 which are fixedly connected to the support structure 63.

The following process steps can be carried out with the above-described smelting plant:

After tapping of a molten bath as shown in FIG. 11, for which purpose the lifting elements 71 are lowered, and the furnace vessel 3 tilts about the upper axes of rotation of the lifting elements 70 which are held fast in position, the lifting elements 71 are lifted again until they reach a position in which there is still a sufficient spacing relative to the lower edge of the furnace vessel cover 6 for the furnace vessel 3 to be displaced horizontally. In that position the support structure is moved towards the left from the position shown in FIG. 6 until either the entire vessel is disposed outside the region of the shaft 10 in order for charging material to be introduced directly into the vessel from a scrap basket, or only into a position as shown in FIG. 7 in order for charging material to be passed from a charging material container 73 by way of the shaft 10 into the right-hand half of the furnace vessel, that is to say the half thereof which is on the side of the electrode lifting apparatus. That position is shown in dash-dotted lines in FIG. 9. In order to prevent environmental pollution due to furnace gases escaping from the left half of the vessel in that position, a cover means which is not shown may be provided here as a horizontal extension of the vessel cover which is shown towards the left in FIG. 7, for example a cover plate which is aligned with the lower edge of the cover and which is fixed to same or in some other fashion. The furnace vessel is then moved back into the starting position shown in FIG. 6 and lifted to such an extent as to ensure the desired closure effect as between the furnace vessel and the vessel cover. In that position further charging material is supplied through the shaft 10 and a column of scrap is thus built up in the shaft, the column of scrap being supported on the floor of the vessel and in the left-hand region of the vessel wall. After closure of the cover 74 which is of the cross-sectional configuration shown in FIG. 6, being in the form of an inverted U, and which is movable horizontally on rails 75, the next furnace charge is smelted down and, as that occurs, the furnace gases produced preheat the column of scrap material. If blocking members as described with reference to FIG. 5 are provided in the shaft 10, then charging material which has been retained in the shaft 10 and also heated up during the refining phase may be charged into the furnace vessel at the desired location after the operation of tapping the furnace vessel.

It will be appreciated that the horizontal mobility of the furnace vessel also makes it possible for the arc electrodes to be moved closer to the column of charging material, during the smelting procedure, in order to expedite the smelting procedure at that location. Partial opening of the furnace vessel, which occurs as a result of that mode of operation, can be avoided by the provision here too of a cover means disposed horizontally in line with the edge of the vessel cover shown at the right in FIG. 7. The discharge of furnace gases can be retarded in the tapping operation as shown in FIG. 11, for example by a chain apron or skirt 74. However the gases which issue in the tilting operation can also be sucked away by a stationary collecting hood.

The structural association of the shaft 10 with the furnace vessel cover 6 does not mean that the shaft must be non-releasably connected to the vessel cover. On the contrary it is desirable for the cover to be replaceable in the event of damage. For that reason, in the embodiment illustrated in FIGS. 6 through 12, the vessel cover 6 is releasably fixed in the holding structure 27 of the shaft 10, which is supported on the foundation columns or pillars 60 so that, after that fixing arrangement has been released, as shown in FIG. 12, the vessel cover can be lowered in such a way as to lie on the upper edge of the furnace vessel, by simultaneous downward movement of the lifting elements, and can be moved with the furnace vessel out of the region of the shaft 10 which is shown at the left in the view shown in FIG. 6 and can then be removed and replaced, by means of a crane.

In the embodiment shown in FIGS. 1 to 3 there is also no need for the vessel cover 6 to be pivoted to the side together with the shaft 10. It is sufficient if the shaft 10 is fixed in the holding structure 27 and the cover 6 is carried by its own arrangement, for example by the lifting and pivoting apparatus 8, and pivoted therewith to the side.

There is also no need for the left-hand wall of the shaft 10 to be aligned with the vessel wall disposed beneath same, as shown in FIG. 6. It may also be displaced somewhat towards the middle of the cover. The important consideration is that a column of material which is charged through the shaft 10 can be supported against the wall 5 of the furnace vessel.

We claim:

1. A smelting plant comprising:
    an electric arc furnace having a furnace vessel, a shaft-like charging material preheater laterally connected to said furnace vessel,
    said furnace vessel having a bottom, an upper edge, a removable cover at the upper edge, and walls extending from the bottom upwardly to the upper edge, wherein the bottom is a furnace hearth, said hearth, said cover and said walls defining an interior space of the furnace vessel,
    said shaft-like charging material preheater having walls defining an interior space, having an upper region and a lower region separate and in communication with each other, wherein said upper region forms a shaft above the upper edge of the furnace vessel, said upper region further having a gas outlet and a top formed as a closable loading opening for charging material; and wherein
    said lower region of the shaft-like charging material preheater is defined at the bottom by a floor adjoining and integrally formed with the furnace hearth, and a wall integrally formed with the wall of the furnace vessel, and having a connecting zone between the interior space of the shaft-like charging material preheater and the interior space of the furnace vessel, and
    said electric arc furnace further having a holding structure for holding the upper region of the shaft-like charging material preheater, the holding structure and the furnace vessel being movable relative to each other.

2. A smelting plant according to claim 1, wherein the vessel cover is releasably fixed to the holding structure.

3. A smelting plant according to claim 1, wherein the holding structure can be lifted relative to the furnace vessel by a lifting apparatus.

4. A smelting plant according to claim 1, wherein the furnace vessel can be lowered relative to the holding structure.

5. A smelting plant according to claim 1, wherein the holding structure is displaceable relative to the furnace vessel in a horizontal direction.

6. A smelting plant according to claim 1, wherein the furnace vessel is displaceable relative to the holding structure in a horizontal direction.

7. A smelting plant according to claim 1, wherein the vessel cover has a middle point and the shaft-like charging material preheater has a vertical center line, a horizontal connecting line being defined by connecting said middle point and said center line, said horizontal direction being parallel to said connecting line.

8. A smelting plant according to claim 1, wherein at least one movable blocking member is arranged in the shaft-like charging material preheater said movable blocking member is movable from a closed position in which a support means is formed thereby to an open or released position for charging of charging material into the furnace, wherein said released position releases a passage of the charging material through the shaft-like charging material preheater.

9. A smelting plant according to claim 8, wherein the blocking member is formed by at least one water-cooled rotatably mounted shaft, and at least one row of cantilever carriers extending from said at last one water-cooled rotatably mounted shaft, said cantilever carriers having free ends, wherein said rotatably mounted shaft is adapted to be driven in at least one direction of rotation and is further adapted to be arrested in a predeterminable angular position, wherein said cantilever carriers are disposed substantially in one plane and are arranged in a closed position in a predeterminable angular position wherein the free ends of said cantilever carriers project into the interior of the shaft-like charging material preheater, and further where in an open position of said free ends of the cantilever carriers, said cantilever carriers are arranged in an angular position below said closed position of said cantilever carriers, thereby allowing the charging material to pass through.

10. A smelting plant according to claim 9, wherein said rotatably mounted shaft with cantilever carriers having free ends are arranged on oppositely disposed walls of the shaft-like charging material preheater, said ends being disposed adjacent to each other and at a spacing from each other in the closed position.

11. A smelting plant according to claim 1, wherein the furnace vessel has an oval shape having two axes, a first axis passing through a center of said oval shape, and a second axis passing through said center and being disposed perpendicular to said first axis, said second axis being longer than said first axis, said oval shape being defined on one side by a straight wall portion cutting said oval shape parallel through said first axis, said straight wall portion together with adjoining portions forming outside walls of the lower region of the shaft-like charging material preheater.

12. A smelting plant according to claim 11, wherein the straight wall portion is between three quarters and nine tenths of the length of the second axis of said oval shape.

13. A smelting plant according to claim 1, wherein the walls of the shaft-like charging material preheater are formed by water-cooled elements.

14. A smelting plant according to claim 1, wherein an interior cross-section of the shaft-like charging material preheater increases in a downward direction towards the lower region of the shaft-like charging material preheater.

15. A smelting plant according to claim 1, wherein the electrode lifting and pivoting apparatus is arranged beside the furnace vessel on a side thereof which is opposite to the shaft-like charging material preheater.

16. A smelting plant according to claim 1, wherein means for removal of the holding structure is arranged beside the furnace vessel on the side of the shaft-like charging material preheater.

17. A smelting plant according to claim 15, wherein means for removal of the holding structure is a lifting and pivoting apparatus, said lifting and pivoting apparatus and the electrode lifting and pivoting apparatus are pivotable into the same direction with respect to the furnace vessel whereby a crane operated scrap basket is unimpededly positioned over the loading opening of the furnace.

18. A smelting plant according to claim 1, wherein fixed on a mobile portal assembly arranged beside the charging material preheater is a lifting apparatus which includes at least one support member adapted to be raised and lowered and which engages the holding structure.

19. A smelting plant according to claim 1, wherein fixed on a mobile portal assembly arranged beside the shaft-like charging material preheater is a lifting apparatus which includes at least one support member adapted to be raised and lowered and which engages an edge of the vessel cover, said vessel cover being fixedly attached to the holding structure.

20. A smelting plant according to claim 18, wherein the support member has a lower position and an upper position, said support member being released from the holding structure in its lower position and when said support member is in the upper position said support member engages into a lifting eye at an edge of the holding structure, said lifting eye being adapted to the support member.

21. A smelting plant according to claim 18, wherein the mobile portal assembly is a rotary portal assembly.

22. A smelting plant according to claim 1, wherein the shaft-like charging material preheater has a vertical center line and, the furnace hearth has a middle point, a horizontal connecting line being defined by joining said middle point and said center line, the furnace vessel being adapted to be tilted perpendicular to said connecting line.

23. A smelting plant according to claim 18, wherein the mobile portal assembly is arranged on a stationary foundation.

24. A smelting plant according to claim 1, wherein a mobile portal assembly is provided comprising at least one support beam extending over the vessel cover and lifting devices releasably connected to said vessel cover.

25. A smelting plant according to claim 24, wherein the mobile portal assembly carries an electrode lifting and pivoting apparatus.

26. A smelting plant according to claim 1, wherein the furnace vessel is fixed in an upper frame having a periphery, said upper frame being supported on a support structure by a frame lifting apparatus.

27. A smelting plant according to claim 26, wherein the support structure is movable.

28. A smelting plant according to claim 26, wherein the frame lifting apparatus is formed by at least three lifting elements which are arranged in a distributed array at the periphery of the frame.

29. A smelting plant according to claim 28, wherein the lifting elements are formed by hydraulically or pneumatically actuable piston-cylinder units.

30. A smelting plant according to claim 26, wherein the furnace hearth has a middle point and the shaft-like charging material preheater has a vertical center line, said middle point of said furnace hearth and said center line of the shaft-like charging material preheater defining a connecting line, lifting elements being disposed on both sides of said connecting line, at least one lifting element on one side of said connecting line being pivotably mounted both in the upper frame and in the support structure about axes of rotation, said axes of rotation being parallel to said connecting line while said at least one lifting element on the other side of said connecting line has vertical guide means and is pivotably mounted about said axis of rotation only in the upper frame.

31. A smelting plant according to claim 26, wherein the support structure comprises two parallel transverse bearers, each said transverse bearer having a middle and an end and a longitudinal bearer which is connected to the middle of each of said parallel transverse bearers.

32. A smelting plant according to claim 31, wherein the furnace hearth has a middle point and the shaft-like charging material preheater has a vertical center line, said middle point of said furnace hearth and said center line of the shaft-like charging material preheater defining a horizontal connecting line and wherein the longitudinal bearer extends parallel to said connecting line.

33. A smelting plant according to claim 28, wherein the frame has corners defining a rectangular configuration, said lifting elements being arranged in each corner of said frame respectively.

34. A smelting plant according to claim 31, wherein the support structure has wheels at the ends of one transverse bearer and in the middle of the other transverse bearer.

35. A smelting plant according to claim 31, wherein the frame is displaced upwardly on a tapping side of the furnace vessel and downwardly on the side of a slag opening.

36. A smelting plant according to claim 26, wherein the holding structure is stationary.

* * * * *